UNITED STATES PATENT OFFICE

2,418,645
DEHYDRATED BUTTER

Jakob L. Jakobsen, Minneapolis, Minn., assignor to General Mills, Inc., a corporation of Delaware No Drawing. Application December 14, 1942, Serial No. 468,981

6 Claims. (Cl. 99—121)

The present invention relates to a process of preserving butter and more particularly involves the removal of water to produce a dehydrated butter.

Numerous attempts have been made to preserve butter in one way or another. One of the commonest examples of this is the production of butter oil, frequently referred to as dehydrated butter. This process involves melting the butter, separating the melted butter oil from the remaining constituents of the original butter, such as water, salts and proteins, usually by means of a centrifuge. The butter oil is then washed repeatedly and packed. In reconstituting butter oil to form butter, it is necessary to add water and some sort of emulsifying agent. Usually milk protein, such as casein, or dry skim milk powder is used for this purpose. Considerable difficulty is experienced in this reconstitution. The protein or skim milk usually becomes denatured in the process of drying involved in its manufacture and it is difficult to get it back into solution or colloidal suspension. As a result the operation is tedious and the ultimate product none too gratifying.

The present invention involves a departure from the procedures of the prior art. Instead of removing the non-fat constituents from the butter, I have found it desirable to leave them in and to merely remove water. It has been found that if butter is dehydrated, that is, actually dried, the salts (derived from the cream from which the butter was made and/or sodium chloride added as flavoring) and proteins are not adversely affected thereby and will go back into solution upon the addition of water. Furthermore, it has been found preferable not to completely remove the water but merely to remove sufficient water so that the butter will have adequate life under the conditions of storage. The salts and proteins may be present in the form of concentrated solutions. The concentrated solution of the various salts inhibits microbiological growth and is practically as effective from the standpoint of preservation as is the complete removal of water. On the addition of water to the dehydrated butter, it is a simple matter to dissolve or colloidally suspend the proteins, as their emulsifying properties have not been lost as a result of denaturization. Consequently, the product may be easily and readily reconstituted to yield a butter having the same desirable taste and odor as the original material and being free from rancidity and other undesirable effects of storing.

It is therefore the primary object of the present invention to provide a process of preserving butter which involves removal of the water without the removal of other non-fat constituents from the butter.

It is another object of the present invention to provide a dehydrated butter product characterized by its ease of reconstitution.

These and other objects of the invention will become more fully apparent from the following description of the invention.

Butter was melted and placed in a vacuum drier wherein the temperature was not permitted to exceed 50° C. The butter was dehydrated under a vacuum until the moisture content was reduced to about 0.5%. The dehydrated butter was poured into containers which were then sealed and the dehydrated butter allowed to solidify. The dehydrated product was kept at room temperature for about a month after which it was reconstituted by gently heating to melt the product and adding about half its weight in water. The mixture was emulsified at around 27° C. for about 40 minutes, after which the emulsion was dumped in water of about 5 to 6° C. where it was chilled for about 2 hours. The solidified butter was then removed from the cold water and was worked to give it a smooth consistency. The resultant product had lost none of its butter-like flavor and it was practically impossible to distinguish it from fresh butter.

The above example may be varied considerably without departing from the spirit of the invention. While it is desirable to maintain the dehydration temperature below 50° C., this is not an absolute maximum but the temperature may be allowed to exceed this figure, depending upon the product ultimately desired. For example, the temperature may be raised to 70° C. or higher. It will be appreciated that the higher the temperature involved in the hydration, the greater the possibility of denaturization of the proteins and of the production of a burnt or off flavor to the butter fat. Likewise, while the extent to which the water is removed is not fixed, substantially complete dehydration is desirable. However, any amount of dehydration short of complete dehydration may be employed as long as the salts and proteins are concentrated to such an extent as to preserve the product against deterioration under the conditions of storage. This will depend largely on the salt content of the original butter. Usually, however, the moisture in the dehydrated butter should not substantially exceed 5%. Furthermore, the method of dehydrating may be varied in any manner apparent to those skilled in the art. Either batch or continuous operation may be employed.

Moreover, the method of reconstitution may be varied. Any type of agitation or emulsification which is found suitable may be used. While it is not necessary to add milk powder or other emulsifying agents, these may be employed if thought desirable.

The amount of water used in reconstitution can be varied to suit individual preference, taste, or legal requirements. For example, the amount of water used may be about that desired in the ultimate product, in which case no water would be removed in the working of the product. It has been found, however, that it is usually preferable to use a larger amount such as about 40% of the weight of the dehydrated butter as this results in better dispersion of the protein and consequently a better emulsion. The excess water can be removed by working the chilled reconstituted product. This removal of excess water may also remove some dissolved salt. This can be compensated for by the addition of salt at the time of working or before. No loss of protein material was observed during the working out of excess water. Numerous other modifications which are apparent to those skilled in the art may be employed without departing from the spirit of the invention and it is understood that the same is not limited to the various modifications specifically disclosed herein but may be varied within the scope of the appended claims.

I claim as my invention:

1. The process of preserving butter which comprises subjecting the butter to vacuum evaporation at a relatively low temperature for a time sufficient to dehydrate the butter to the extent necessary to preserve it under the conditions of storage.

2. The process of preserving butter which comprises melting the butter, subjecting the melted butter to vacuum evaporation at a temperature which will not adversely affect the flavor and which will not denature the proteins, for a time sufficient to dehydrate the butter to the extent necessary to preserve it under the conditions of storage.

3. The process of treating butter which comprises vacuum drying butter to a moisture content necessary to preserve it under the conditions of storage, storing the dried butter for a desired period, and reconstituting the dried butter by adding water and emulsifying the resultant mixture.

4. The process of preserving butter which comprises melting the butter, vacuum drying the melted butter at a temperature not substantially in excess of 70° C. to a moisture content not in excess of about 5%, storing the dried butter for a desired period, and reconstituting the dried butter by adding water and emulsifying the mixture.

5. A dehydrated butter product containing the normal constituents of butter in their normal relative proportions, with the exception of water, the water content being substantially below normal and insufficient to adversely affect the butter during storage.

6. A dehydrated butter product containing the normal constituents of butter in their normal relative proportions, with the exception of water, the water content being not in excess of about 5 per cent.

JAKOB L. JAKOBSEN.

REFERENCES CITED

The following references are of record in the file of this patent:

UNITED STATES PATENTS

| Number | Name | Date |
| --- | --- | --- |
| 1,054,422 | Johnson | Feb. 25, 1913 |
| 882,006 | Johnson | Mar. 17, 1908 |
| 2,272,578 | Penn | Feb. 10, 1942 |
| 995,303 | Swenarton | June 13, 1911 |

FOREIGN PATENTS

| Number | Country | Date |
| --- | --- | --- |
| 71,224 | Sweden | July 19, 1927 |
| 114,807 | Australian | Mar. 19, 1942 |

OTHER REFERENCES

Ward, "The Encyclopedia of Food," article on Ghee, pages 223, 224, published by the author, New York, 1923.

Hunziker, "The Butter Industry," Edition 3, 1940, pages 436–438.